3,402,115
PREPARATION OF QUATERNARY AMMONIUM HYDROXIDES BY ELECTRODIALYSIS
Charles R. Campbell and Roland R. Spiegelhalter, Pensacola, Fla., assignors to Monsanto Company, St. Louis, Mo., a corporation of Delaware
No Drawing. Filed Mar. 12, 1965, Ser. No. 439,432
8 Claims. (Cl. 204—180)

The invention described and claimed herein is a method for preparing quaternary ammonium hydroxides. More specifically, an electrolytic process for preparing quaternary ammonium hydroxides from bis-quaternary ammonium sulfate salts is claimed as the invention.

Quaternary ammonium hydroxides have numerous applications. Among these is their use as a precursory material for preparing salts of various acids. Some of these salts are quite useful as supporting electrolytes in organic electrolytic processes. Some such salts are especially useful as a supporting electrolyte in a recently developed process for electrohydrodimerizing acrylonitrile to adiponitrile, a hexamethylene diammonium adipate intermediate. Quaternary ammonium hydroxides themselves are necessary for controlling pH in an aqueous solution of the corresponding supporting electrolytic salt.

Various methods have been developed for producing quaternary ammonium hydroxides. Included among these methods is an electrolytic process for obtaining the desired hydroxides from quaternary ammonium chlorides. A second process includes reacting quaternary ammonium sulfate salts and calcium hydroxide thereby precipitating calcium sulfate. The electrolytic-ion exchange process for producing hydroxides from the corresponding quaternary ammonium chloride has a marked disadvantage in that free chlorine, a highly corrosive material, is liberated. Furthermore, quaternary ammonium chlorides are relatively expensive. The product yielded by the calcium hydroxide-quaternary ammonium sulfate reaction contains contaminating metal ions and is unsuitable for many uses.

Therefore, an object of this invention is to provide a process for producing quaternary ammonium hydroxides in a highly pure state at reasonable cost.

A further object is to provide a process for preparing quaternary ammonium hydroxides from bis-quaternary ammonium sulfate salts.

Other objects will become apparent from the following descriptive material.

The objects are achieved by providing a process for producing a quaternary ammonium hydroxide from a bis-quaternary ammonium sulfate salt in an electrolytic cell containing three chambers. These chambers include an anolyte chamber containing an anode, a catholyte chamber containing a cathode, and a chamber containing bis-quaternary ammonium sulfate salt positioned between the anolyte and catholyte chambers. The chamber containing salt, i.e., salt chamber, is separated from the anolyte chamber by a strongly basic anion exchange resin membrane and is separated from the catholyte chamber by a strongly acidic cation exchange resin membrane. In the instant process an aqueous solution of bis-quaternary ammonium sulfate salt is continuously circulated through the salt chamber, an aqueous sulfuric acid solution is continuously circulated through the anolyte chamber, and an aqueous quaternary ammonium hydroxide solution is continuously circulated through the catholyte chamber. An electrical potential is established between the anode and cathode sufficient to produce a flow of unidirectional electrical current having a density from 0.05 to 1.0 ampere per square centimeter of effective cathode area. Because of the flow of electrical current, sulfate ions migrate through the strongly basic anion exchange resin membrane into the anolyte while quaternary ammonium ions migrate through the strongly acidic cation exchange resin membrane into the catholyte. Sulfuric acid concentration in the aqueous sulfuric acid solution is maintained between 0.05 and 3.0 N. Quaternary ammonium hydroxide concentration in the aqueous quaternary ammonium hydroxide solution is maintained between 0.1 and 1.0 N. The product of the process is obtained by continuously withdrawing a portion of the aqueous quaternary ammonium hydroxide solution from the catholyte chamber.

The equipment for performing the inventive process is composed of two basic units: the cell and an attendant circulation system. The circulation system contains the usual equipment, i.e., piping, pumps, holdup vessels, valves, coolers, etc. For purposes of describing this invention, it is sufficient to say that this system performs the function of continuously moving liquid through the various chambers in the cell at prescribed rates and cools the streams if such is necessary.

A cell employed to practice the inventive process has a number of general requirements. It must have a chamber through which anolyte can be continuously circulated. An anode is positioned within this chamber or forms a side of the chamber. In the cell form advantageously employed in practicing the instant process, the anode forms one side of the chamber. The anode can be made of any electrically conductive material sutiable for forming into an electrode which is relatively unaffected by sulfuric acid, such as lead having a minor quantity of silver therein.

The cell must have a chamber through which catholyte can be continuously circulated. A cathode is either positioned within the chamber or forms a portion of the chamber. The cathode is made of electrically conductive material that can be formed into an electrode which is impervious to alkaline attack, such as stainless steel.

A third chamber is positioned between the anolyte and catholyte chambers. This chamber is adapted to have continuously circulated therethrough an aqueous solution of bis-quaternary ammonium sulfate salt. This salt chamber is separated from the anolyte chamber by a membrane made of a strongly basic anion exchange resin. The salt chamber is separated from the catholyte chamber by a membrane made of a strongly acidic cation exchange resin. Both membranes are highly permselective.

An example of strongly basic anion exchange resins is a polystyrene-divinyl benzene copolymer having as functional groups linked thereto quaternary ammonium or amino groups. An example of suitable strongly acidic cation exchange resins is polystyrene-divinyl benzene copolymer having $SO_3H$, $COOH$, or like functional groups linked thereto.

The invention finds especial usefulness in preparing quaternary ammonium hydroxides from bis-quaternary ammonium sulfate salts wherein each of the alkyl groups of the quaternary ammonium ions is a saturated aliphatic group containing from 1 to 4 carbon atoms. They may be straight chain or branched, whichever is preferred. Of course, larger alkyl groups are permissible even though the quaternary ammonium hydroxides having such larger alkyl groups are not as commercially desirable as are the above described preferred salts.

To perform the instant process, a flow of aqueous salt solution is established through the salt chamber. At the same time a flow of anolyte and catholyte is established through the proper chambers. The concentration of salt in the aqueous salt solution is maintained at a level sufficient ot provide maximum current efficiency. Salt concentrations ranging from 5–60 percent by weight have been found to be quite adequate; although, concentrations from 20–60 weight percent are preferred. To provide for initial current flow across the cell a quantity of sulfuric acid must be contained in the anolyte and a quantity of the hydroxide corresponding to the bis-quaternary ammonium sulfate salt must be in the catholyte. The quantity required must be sufficient to provide for initial passage of electrical current.

Once circulation through the chambers has begun, an electrical potential is established between the anode and cathode. This potential is sufficient to provide a unidirectional current flow having a density of 0.05 to 1.0 ampere per square centimeter of effective cathode area.

The passage of current through the aqueous electroconductive solutions and the membranes causes migration of sulfate ions into the anolyte chamber and migration of quaternary ammonium ions into the catholyte chamber. The sulfate ions join with hydrogen ions to form sulfuric acid. Quaternary ammonium ions join with hydroxyl ions to form a quaternary ammonium hydroxide. The strongly basic anion exchange resin membrane separating the salt chamber and anolyte chamber permits passage of sulfate ions from the salt chamber to the anolyte chamber but prevents passage of hydrogen ions from the anolyte into the salt chamber. Quaternary ammonium ions pass through the strongly acidic cation exchange resin membrane separating the salt chamber and catholyte chamber while hydroxyl ions are prevented from passing from the catholyte chamber into the salt chamber. Both sulfate and quaternary ammonium ions are highly hydrated during passage through the membranes and therefore transfer water from the salt chamber into both catholyte and anolyte. During cell operation, hydrogen is discharged at the cathode and oxygen at the anode thus, of course, releasing hydroxyl ions and hydrogen ions, respectively.

As sulfate ions pass into the anolyte, initial sulfuric acid concentration is thereby increased. Therefore, to maintain the sulfuric acid concentration range 0.05 to 2 N, it is necessary to remove a portion of the anolyte and replace it with water. A favorable acid normality range is between 0.1 and 1.0 N. Thus, in effect, a second product, sulfuric acid, is obtained as an aqueous solution.

Quaternary ammonium hydroxide concentration in the catholyte increases above the initial concentration as quaternary ammonium ions pass from the salt chamber into the catholyte chamber and join with hydroxyl ions. To maintain the catholyte concentration range 0.1 to 1.0 N (preferred range—0.25 to 0.75 N), a portion of the anolyte is drawn off and replaced with water. Thus a product is provided composed of a substantially pure aqueous quaternary ammonium hydroxide solution having from 2–20 weight percent quaternary ammonium hydroxide therein.

The salt solution, catholyte, and anolyte are all recirculated through the proper chambers. Recirculation rates are such as to provide a linear flow velocity sufficient to hold temperature elevation in the cell to not more than about 10° C. and to prevent concentration polarization effects in the cell. A linear flow velocity between 0.5 and 3 ft./sec. through the various chambers has been found to be quite adequate. Of course, total flow will vary with current density and cell design.

As sulfate and quaternary ammonium ions and water migrate from the salt chamber, to maintain operation of the cell these materials must be continuously replenished by adding more aqueous salt solution. This addition is sufficient to provide for continuous circulation and to maintain the salt concentration, as noted before, between 5–60 weight percent.

An example illustrating the invention in detail is hereinafter set forth. It is not intended that the example limit the scope of the invention in any manner whatsoever.

EXAMPLE

A three-chamber (salt chamber, catholyte chamber, and anolyte chamber) cell having an anode made of lead-silver (1% silver) alloy and a cathode fabricated from 304 stainless steel was assembled. A membrane of sulfonated copolymer of styrene and divinyl benzene supported on a glass cloth backing was placed between the catholyte and salt chamber. A membrane made of copolymer of styrene and divinyl benzene having quaternary ammonium functional groups was interposed between the salt and anolyte chambers.

Eighteen hundred ml. of 0.512 N sulfuric acid were placed in an anolyte surge tank. Fifteen hundred ml. of 1.856 N bis-tetramethylammonium sulfate were placed in a salt surge tank. Thirty-five hundred ml. of 0.491 N tetramethylammonium hydroxide were placed in a catholyte surge tank.

Circulating pumps were then started and adjusted so that the flow through the chambers was such that one pound positive pressure was exerted from the salt chamber toward both the anolyte and catholyte chambers. The flow rates so employed were 1.33, 1.54, and 1.33 ft./sec. for anolyte, salt solution, and catholyte, respectively.

An electrical potential across the cell was then established and adjusted to provide a unidirectional current flow having a density of 0.25 amp./cm.$^2$ of effective cathode surface. During the first 30 minutes of operation anolyte temperature increased to 44° C., salt solution temperature increased to 52° C., and catholyte temperature rose to 51° C. Through the balance of the test, temperatures remained essentially at these levels. Cell voltage dropped from an initial 16 volts to 11 volts during the test while salt solution pH increased from 7.0 to 13.2. Total operation time was 5.5 hours during which 5.13 faradays of current were consumed.

Seven hundred and seventy-five ml. of 4.05 N salt solution were added to the salt solution circulating through the salt chamber but no additions were made to the catholyte or anolyte. Sufficient aqueous sulfuric acid was withdrawn from the anolyte and sufficient aqueous tetramethylammonium hydroxide was withdrawn from the catholyte to maintain the circulating quantity thereof substantially constant. Total initial plus manufactured sulfuric acid was 1910 ml. of 1.619 N aqueous solution. Initial and electrolytically produced tetramethylammonium hydroxide totaled 4200 ml. of 0.853 N aqueous solution. At the conclusion of the run, 1500 ml. of 1.798 N aqueous salt (0.134 equivalents free alkalinity) were recovered.

The tetramethylammonium hydroxide product contained 0.28 percent sulfate calculated as sulfuric acid.

Test conditions and results are summarized in the table below.

Table.—Test conditions and results

| | |
|---|---|
| Anolyte: | |
| Anolyte charge, equivalents—SO$_4$ | 0.922 |
| Anolyte at end of test, equivalents—SO$_4$ | 3.095 |
| Increase, equivalents—SO$_4$ | 2.173 |
| Catholyte: | |
| Catholyte charge, equivalents—(CH$_3$)$_4$N$^+$ | 1.718 |
| Catholyte at end of test, equivalents—(CH$_3$)$_4$N$^+$ | 3.585 |
| Increase, equivalents—(CH$_3$)$_4$N$^+$ | 1.867 |
| Salt: | |
| Salt initially charged, equivalents | 2.783 |
| Salt added, equivalents | 3.130 |
| Salt left at end of test, equivalents | 2.700 |
| Decrease, equivalents | 3.079 |
| Current efficiency, percent | 36.4 |

(Equivalents tetramethylammonium hydroxide/faraday.)

The invention has the obvious advantage of producing a product of quite high purity. The process is relatively simple and produces a desired product at reasonable cost. Raw materials for use in the process are relatively inexpensive.

The invention has been described by reference to a specific example and specific procedure. Nevertheless, it is to be limited only by the scope of the appended claims.

What is claimed is:

1. An electrolytic process for producing a quaternary ammonium hydroxide from a bis-quaternary ammonium sulfate salt in an electrolytic cell containing three chambers wherein said chambers include an anolyte chamber containing an anode, a catholyte chamber containing a cathode, and a chamber containing bis-quaternary ammonium sulfate salt positioned between said anolyte and catholyte chambers, said salt chamber being separated from said anolyte chamber by a strongly basic anion exchange resin membrane and being separated from said catholyte chamber by a strongly acidic cation exchange resin membrane, said process comprising, in combination:
   (a) continuously circulating an aqueous solution of said bis-quaternary ammonium sulfate salt through said salt chamber, an aqueous sulfuric acid solution through said anolyte chamber, and an aqueous quaternary ammonium hydroxide solution through said catholyte chamber;
   (b) establishing an electrical potential between said anode and cathode sufficient to produce a flow across said cell of unidirectional electrical current having a density from 0.05 to 1.00 ampere per square centimeter of effective cathode area thereby causing sulfate ions to migrate through said strongly basic anion exchange resin membrane into said anolyte chamber and causing quaternary ammonium ions to migrate through said strongly acidic cation exchange resin membrane into said catholyte chamber;
   (c) maintaining the sulfuric acid concentration in said aqueous sulfuric acid solution between 0.05 and 3.0 N;
   (d) maintaining the quaternary ammonium hydroxide concentration in said aqueous quaternary ammonium hydroxide solution between 0.1 and 1.0 N; and
   (e) withdrawing as process product a portion of said aqueous quaternary ammonium hydroxide solution.

2. The process of claim 1 wherein each of the alkyl groups of the quaternary ammonium ions in the bis-quaternary ammonium sulfate salt is a saturated aliphatic group containing from 1 to 4 carbon atoms.

3. The process of claim 1 wherein the aqueous solution of bis-quaternary ammonium sulfate salt has a concentration from 5.0 to 60 percent based on solution weight.

4. The process of claim 1 wherein sulfuric acid concentration in the anolyte chamber is between 0.1 and 1.0 N.

5. The process of claim 1 wherein quaternary ammonium hydroxide concentration in the catholyte chamber is between 0.25 and 0.75 N.

6. The process of claim 1 wherein electrical current density is between 0.15 and 0.60 ampere per square centimeter of effective cathode area.

7. The process of claim 1 wherein circulation through the anolyte chamber, catholyte chamber and chamber containing salt is maintained in the range of 0.5 to 3 feet per second linear flow velocity.

8. An electrolytic process for producing a quaternary ammonium hydroxide from a bis-quaternary ammonium sulfate salt, which salt has as the alkyl groups of the quaternary ammonium ions saturated aliphatic groups wherein each saturated aliphatic group contains from 1 to 4 carbon atoms, in an electrolytic cell containing three chambers wherein said chambers include an anolyte chamber containing an anode, a catholyte chamber containing a cathode and a chamber containing bis-quaternary ammonium sulfate salt positioned between said anolyte and catholyte chambers, said salt chamber being separated from said anolyte chamber by a strongly basic anion exchange resin membrane and being separated from said catholyte chamber by a strongly acidic cation exchange resin membrane, said process comprising, in combination:
   (a) continuously circulating at a linear flow velocity between 0.5 and 3 feet per second a 20–60 weight percent aqueous solution of said bis-quaternary ammonium sulfate salt through said salt chamber, an aqueous sulfuric acid solution having a normality between 0.1 and 1.0 through said anolyte chamber, and an aqueous quaternary ammonium hydroxide solution having a normality between 0.25 and 0.75 through said catholyte chamber;
   (b) establishing an electrical potential between said anode and cathode sufficient to produce across said cell a unidirectional electrical current having a density between 0.05 and 1.0 ampere per square centimeter of effective cathode area thereby causing sulfate ions to migrate through said strongly basic anion exchange resin membrane into said anolyte chamber and causing quaternary ammonium ions to migrate through said strongly acidic cation exchange resin membrane into said catholyte chamber; and
   (c) withdrawing quaternary ammonium hydroxide as a 2 to 20 weight percent aqueous solution.

References Cited
UNITED STATES PATENTS

| | | | |
|---|---|---|---|
| 2,363,386 | 11/1944 | Bock | 204—72 |
| 2,636,852 | 4/1953 | Juda et al. | 204—151 |
| 3,051,640 | 8/1962 | Traxler | 204—180 |

JOHN H. MACK, *Primary Examiner.*

A. C. PRESCOTT, *Assistant Examiner.*